Jan. 10, 1950 A. N. EPSTEIN 2,493,954

COMBINATION RECEIVER-TRANSMITTER TELEPHONE UNIT

Filed Sept. 14, 1945 2 Sheets-Sheet 1

INVENTOR.
Alvin N. Epstein
BY
J. Clarke Hagey
Att'y.

Jan. 10, 1950 A. N. EPSTEIN 2,493,954

COMBINATION RECEIVER-TRANSMITTER TELEPHONE UNIT

Filed Sept. 14, 1945 2 Sheets-Sheet 2

INVENTOR.
Alvin N. Epstein
BY
J. Clarke Hagey
Atty.

Patented Jan. 10, 1950 2,493,954

UNITED STATES PATENT OFFICE 2,493,954

COMBINATION RECEIVER-TRANSMITTER TELEPHONE UNIT

Alvin N. Epstein, Chicago, Ill.

Application September 14, 1945, Serial No. 616,170

5 Claims. (Cl. 179—157)

This invention relates to combination receiver-transmitter units of telephone apparatus, and more particularly concerns the construction of such units to permit them to be conveniently rested upon the shoulder of the user and held thereupon by application of the ear to the telephone receiver, whereby the user's hands may be free for other purposes, such as for making notations, consulting records, listing orders, etc., while carrying on a two-way telephone conversation.

The principal object of the invention is to provide a construction of the aforesaid character in which the shoulder-rest is embodied as a structural part of the usual telephone hand set. I mean by this to include a one-piece telephone hand set with the shoulder-rest molded or otherwise formed as an integral part thereof, but I do not mean to be limited thereto, since it may be a more desirable method of manufacture to mold or otherwise form the shoulder-rest as a separate part and secure it to the hand set.

Another object of the invention is to provide a shoulder-rest of the aforesaid character embodied as a structural part of the usual telephone hand set, in which the shoulder-rest may be easily adjusted to suit the convenience and comfort of the user, and a further object of the invention is to provide a shoulder-rest of the aforesaid character embodied as a structural part of the usual telephone hand set, in which the shoulder-rest may be readily adjusted for use upon either shoulder of the user. All of the embodiments of my invention shown and described hereinafter are to be distinguished from attachments designed to be applied as such by the user to the telephone apparatus.

In the drawings—

Figures 4, 5, 6, 7:
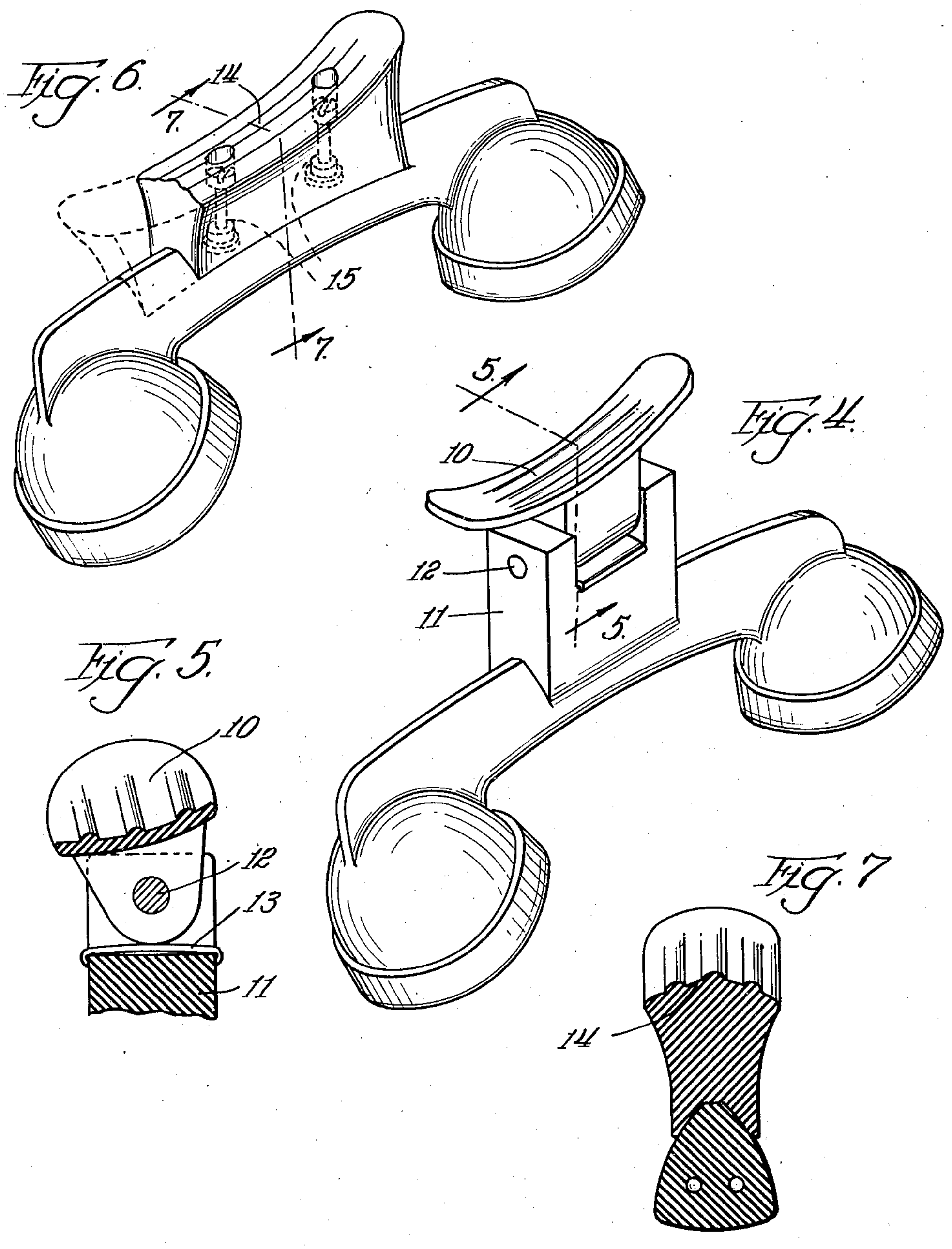
Fig. 4 is a perspective view of a combination receiver-transmitter telephone unit constructed according to another form of my invention, in which the shoulder-rest is pivotally attached to the unit to permit angular adjustment thereof by the user.
Fig. 5 is a fragmentary view in cross section and upon an enlarged scale, taken upon the line 5—5 of Fig. 4.

Fig. 6 is a perspective view of a combination receiver-transmitter telephone unit constructed according to still another form of my invention, showing in full lines the shoulder-rest formed as an integral part of the unit and, in dotted lines, the shoulder-rest and attached screws employed when the shoulder-rest is formed as a separate part and attached to the unit; and Fig. 7 is a view in cross section and upon an enlarged scale, taken upon the line 7—7 of Fig. 6.

In carrying out the present invention, particular attention has been given to providing for the use of the shoulder-rest upon either shoulder, whereby the telephone receiver part of the unit may be applied to either ear and the telephone transmitter part held in position near the mouth of the user, and it will be noted that this feature of construction is present in each of the forms shown in the several figures of the drawings.

Figure 1:
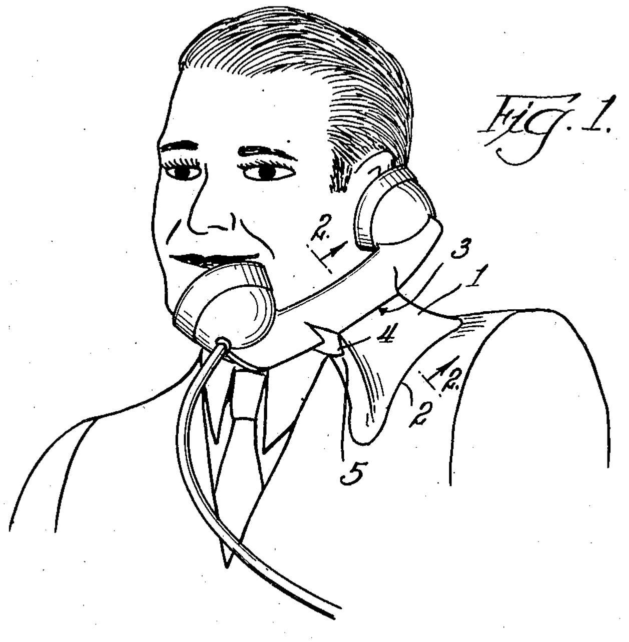
Figure 1 illustrates the method of using a combination receiver-transmitter telephone unit constructed according to one form of my invention.
Figure 2:
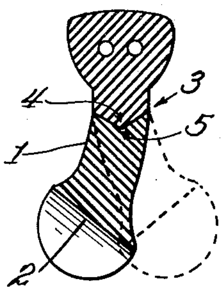
Fig. 2 is a view in cross section, upon an enlarged scale, taken upon the line 2—2 of Fig. 1.
Figure 3:
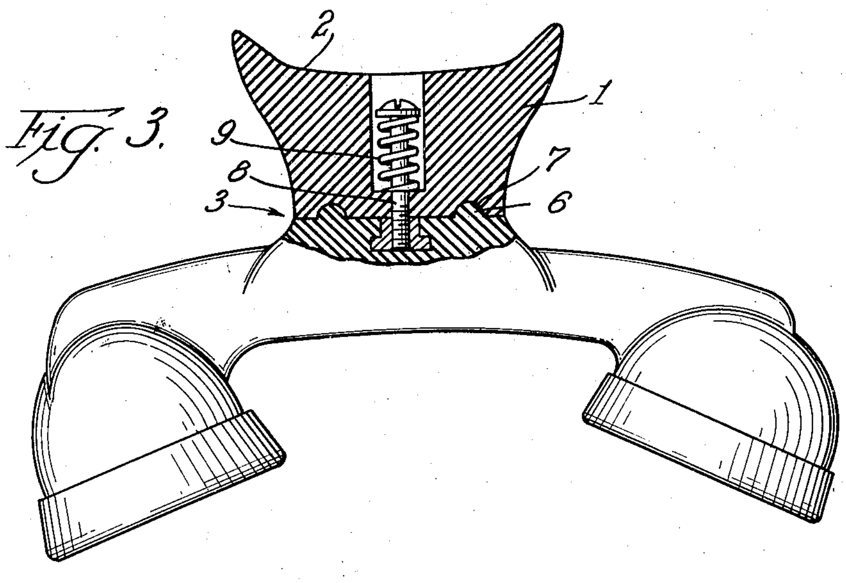
Fig. 3 is a side view, partly in elevation and partly in section, upon an enlarged scale, of the unit shown in Fig. 1, embodying a slight modification in detail of construction and illustrating the swiveled arrangement to permit convenient right and left adjustment of the shoulder-rest.

Figures 1 to 3, inclusive, illustrate the embodiment of my invention in a telephone hand set in which the shank 1 of the shoulder-rest is curved to a degree to permit the full under face of the arcuate base 2 to be rested upon the forward part of the shoulder and present the telephone hand set at a convenient angle for application of the mouth and ear of the user to the respective receiver and transmitter parts thereof. In Figure 1, the device is shown resting upon the left shoulder of the user. To provide for adjustment of the device for use upon the right shoulder and for similar positioning of the hand set for application of the right ear to the telephone receiver, I arrange for reversing the curved shank of the shoulder-rest with respect to the hand set. The shank 1 is transversely sectioned at 3 and the opposite contacting faces of the two sections are tongued and grooved or otherwise shaped for locking engagement with each other, as illustrated by the V-shaped ridge 4 and channel 5 of Figures 1 and 2, or by the projections 6 and cooperating sockets 7 of Figure 3. The sections are held together by the swivel-pin 8 and spring 9 in an obvious manner to permit the curved shank 1 to be released from the locking means, twisted about or turned 180 degrees around the pivot-pin, and re-engaged with the locking means, to thereby reverse the curved shank 1 of the shoulder-rest with respect to the hand set, as illustrated by dotted lines in Figure 2.

Figures 4 and 5 illustrate another embodiment of my invention in a telephone hand set in which the angle of the shoulder-rest may be adjusted with respect to the hand set. In this arrangement, the arcuate base 10 is hinged to the shank 11 of the shoulder-rest by a hinge-pin 12, so that it may be swung to different angles to provide a comfortable position for use upon either shoulder of the user. Friction means, such as the flat spring 13, may be provided to retain the base 10 in the desired angular adjustment. For the purpose of illustration only, I have shown a straight shank 11 extending a considerable distance perpendicularly from the back of the hand set, with the hinge-pin 12 located near the outer end part of the shank and the arcuate base 10 in tight rocking adjustment thereupon, constituting in effect a straight shank extension with an adjustable shoulder-engaging shoe, but the two parts 10 and 11 of the shoulder-rest, which constitute the two members of the hinge, may each be of the proper length to permit the hinge-pin 12 to be located any desired distance from the hand set. With the hinge located about midway of the shank, the effect would be to provide for bending the shank to any desired extent in either of two directions and, with the hinge located near the hand set, the effect would be to provide for swinging the hand set to any desired extent in either of two directions upon a pedestal-like shoulder-rest.

Figures 6 and 7 illustrate still another embodiment of my invention in a telephone hand set, in which the shoulder-rest is formed or attached as an integral part of the hand set. The shoulder-engaging face of the shoulder-rest is beveled or rounded, as shown at 14, to provide for tilting the hand set at the desired angle upon either shoulder of the user. When molded or otherwise formed as a solid part of the hand set, the shoulder-rest may be formed as shown in full lines in Figure 6, and, when molded or otherwise formed as a separate part, the shoulder-rest may be firmly attached to the hand set by means of the screws 15 and, if preferred, the arcuate shoulder-engaging face may be extended, all as shown in dotted lines in Figure 6. The forming of the shoulder-rest as a solid part of the hand set or as a firmly attached separate part thereof is largely a question of economy in manufacture, but, whichever method of manufacture is employed, I believe I am the first to provide a shoulder-rest embodied as a structural part of a hand set comprising telephone receiver and transmitter elements.

I claim:

1. A combination receiver-transmitter telephone unit comprising a telephone receiver, a telephone transmitter, a shank connecting said receiver and said transmitter, and a shoulder-rest extending radially with respect to the axis of said shank and comprising a plurality of relatively adjustable portions, a first portion thereof being fixed with respect to said shank and a second portion thereof being connected with said first portion and held by such connection in engagement with said first portion to permit adjustable movement of said second portion with respect to said first portion about an axis radial to the axis of said shank to thereby change the angular position of said second portion with respect to the axis of said shank.

2. A combination receiver-transmitter telephone unit comprising a telephone receiver, a telephone transmitter, a shank connecting said receiver and said transmitter, and a shoulder-rest extending radially with respect to the axis of said shank and comprising a plurality of relatively adjustable portions, a first portion thereof being fixed with respect to said shank and a second portion thereof being swiveled upon said first portion to permit adjustable movement of said second portion with respect to said first portion about an axis radial to the axis of said shank, and releasable locking means engaging said first and second portions and acting to retain said second portion in selected adjusted positions.

3. A combination receiver-transmitter telephone unit comprising a telephone receiver, a telephone transmitter, a shank connecting said receiver and said transmitter, and a shoulder-rest extending radially with respect to the axis of said shank and comprising a plurality of relatively adjustable portions, a first portion thereof being fixed with respect to said shank and having a contact surface formed thereon, a second portion thereof having a contact surface formed thereon for cooperative engagement with the contact surface of said first portion, and a swivel connection extending radially with respect to the axis of said shank holding said first and second portions with their respective contact surfaces in adjustable cooperative engagement.

4. A combination receiver-transmitter telephone unit comprising a telephone receiver, a telephone transmitter, a shank connecting said receiver and said transmitter, and a shoulder-rest extending radially with respect to the axis of said shank and comprising a plurality of relatively adjustable portions, a first portion thereof being fixed with respect to said shank and having a surface provided with locking means, a second portion thereof having a surface and locking means for respective cooperative engagement with the surface and locking means of said first portion, and a swivel connection holding said first and second portions with their respective surfaces and locking means in cooperative engagement and permitting release of said locking means, turning of said second portion about said swivel connection with respect to the axis of said shank, and re-engagement of said locking means.

5. A combination receiver-transmitter telephone unit comprising a telephone receiver, a telephone transmitter, a shank connecting said receiver and said transmitter, and a shoulder-rest extending in part radially and in part tangently with respect to said shank and comprising a plurality of relatively adjustable portions, a first radially extending portion thereof being fixed with respect to said shank and having a contact surface formed thereon, a second tangently extending portion thereof having a contact surface engaging the contact surface of said first portion, and a swivel connection holding said first and second portions with their respective contact surfaces in engagement and permitting said second portion to be turned about said swivel connection to vary the tangent angle of extension of said second portion with respect to said shank.

ALVIN N. EPSTEIN.

REFERENCES CITED

The following references are of record in the file of this patent:

UNITED STATES PATENTS

| Number | Name | Date |
|---|---|---|
| 1,939,449 | Horn | Dec. 12, 1933 |
| 2,243,554 | Epstein | May 27, 1941 |
| 2,348,138 | Lotus et al. | May 2, 1944 |

FOREIGN PATENTS

| Number | Country | Date |
|---|---|---|
| 59,973 | Denmark | July 20, 1942 |